(12) United States Patent
Hiraiwa

(10) Patent No.: US 6,793,600 B2
(45) Date of Patent: Sep. 21, 2004

(54) POWERTRAIN FOR HYBRID ELECTRIC VEHICLES

(75) Inventor: Kazuyoshi Hiraiwa, 6-5-8, Tomioka-Nishi, Kanazawa-Ku, Yokohama (JP)

(73) Assignee: Kazuyoshi Hiraiwa, Yokohama (JP)

( * ) Notice: Subject to any disclaimer, the term of this patent is extended or adjusted under 35 U.S.C. 154(b) by 0 days.

(21) Appl. No.: 09/994,455

(22) Filed: Nov. 28, 2001

(65) Prior Publication Data

US 2003/0100395 A1 May 29, 2003

(51) Int. Cl.$^7$ ................................................. F16H 3/72
(52) U.S. Cl. ............................................................ 475/5
(58) Field of Search ........................... 477/3, 5; 475/5, 475/288, 330; 180/65.2, 65.3, 65.4

(56) References Cited

U.S. PATENT DOCUMENTS

| | | | | |
|---|---|---|---|---|
| 5,558,589 A | * | 9/1996 | Schmidt | 475/5 |
| 5,935,035 A | * | 8/1999 | Schmidt | 475/5 |
| 6,010,422 A | * | 1/2000 | Garnett et al. | 475/5 |
| 6,053,833 A | * | 4/2000 | Masaki | 475/5 X |
| 6,478,705 B1 | * | 11/2002 | Holmes et al. | 475/5 |

FOREIGN PATENT DOCUMENTS

| JP | 2000-326739 | * 11/2000 |
|---|---|---|
| JP | 2001-010361 | * 1/2001 |

OTHER PUBLICATIONS

Jack Yamaguchi, "Toyota Readies Gasoline/Electric Hybrid System", Jul. 1997, Automotive Engineering, pp. 55–58.*

* cited by examiner

Primary Examiner—Roger Pang

(57) ABSTRACT

A powertrain for hybrid electric vehicle has an internal engine 10, two motors/generators 46, 54, and two planetary gear sets. A first planetary gear set 20 has a first sun gear 22 that establishes a reduced speed ratio when it is brake. A second planetary gear set 30 has a second sun gear 32 that establishes a overdrive ratio.

5 Claims, 4 Drawing Sheets

POWERTRAIN FOR HYBRID ELECTRIC VEHICLES

BACKGROUND OF THE INVENTION

This invention relates to a powertrain for hybrid electric vehicles that carry two drive sources, an internal combustion engine and electric motor on board.

The hybrid electric vehicle is propelled by one or both of the internal combustion engine and the electric motor, running according to driving conditions so as to reduce the air pollution resulting from the internal combustion engine and improve the fuel economy.

Such a type of the hybrid vehicle is shown in "Automotive Engineering/July 1997" (page 56–58). This powertrain includes an internal combustion engine, an electric motor, an electric generator, a battery and a power-split device. The power-split device consists of one planetary gear set: it has a sun gear, a ring gear (an internal teethed gear), a planetary carrier. The ring gear is coaxial with the sun gear and the planetary carrier. The planetary carrier supports rotatably pinions meshing with both of the sun gear and the ring gear. The sun gear is connected to the generator, the ring gear to the motor, and the planetary carrier to the engine.

Its Operations are as follows:

Startup, low-speed and low-speed deceleration operation: The battery supplies the electric motor with electricity to propel the vehicle. The engine is stopped by fuel cut-off because its load is low in this operation.

Normal operation: The power-split device divides engine's output, one part driving the vehicle and the other driving the generator to supply its electric output to the motor. The motor adds its output to the propulsion of the vehicle in addition to the power of the engine.

Full-throttle operation: The engine' full power is provided to the vehicle's wheels. In addition, the motor, supplied with electricity from the battery, drives wheels to augment the drive power.

The above type of the prior powertrain, however, has following drawbacks:

In the normal operation, its maximum torque is not so large to drive medium- and heavy-duty vehicles such as commercial cars, buses or trucks. Besides its fuel efficiency is low.

The reason is as follows: As one part of engine's output is divided by the power-split device to drive the generator for supplying its electric output to the motor in the normal operation, the total efficiency includes a mechanical transmitting efficiency of the power-split device, an electricity-generating efficiency of the generator, an electricity-transmitting efficiency between the generator and the motor and a driving efficiency of the motor. This effects fuel consumption worse than vehicles with only a mechanical transmission.

Besides the power-split device has no ability to increase the engine's torque enough for driving medium- and heavy-duty vehicles.

SUMMARY OF THE INVENTION

It is an object of the invention to provide a powertrain for hybrid electric vehicles that can obtain a large torque enough for driving medium- and heavy-duty vehicles such as trucks and commercial vehicles.

It is another object of the invention to provide a powertrain for hybrid electric vehicles that can reduce fuel consumption.

It is still another object of the invention to provide a powertrain for hybrid electric vehicles with a compact powertrain.

For the above purposes, in accordance with the present invention, there is provided a powertrain for hybrid electric vehicles comprising an internal combustion engine, an input shaft connected to the engine, an output shaft, a plural sets of planetary gear sets between the input shaft and the output shaft, a first electric motor/generator and a second electric motor/generator.

The planetary gear sets include a first planetary gear set and a second planetary gear set. The first planetary gear set has a first rotatable member, and the second planetary gear set has a second rotatable member. The first rotatable member establishes a reduced speed ratio when it is braked, and the second rotatable member establishes an overdrive speed ratio when it is braked. The first electric motor/generator is connectable with the first rotatable member. The second electric motor/generator is connectable selectively with the second rotatable member or with the output shaft.

Preferably, the plural sets of planetary gear sets may comprise two sets, the first planetary gear set and the second planetary gear set. The second planetary gear set has a driving member connectable with the second rotatable member via an idle gear.

Preferably, the driving member may be connected with a shaft of a power take-off device.

Preferably, the plural sets of planetary gear sets may comprise three sets, the first planetary gear set, the second planetary gear set, and a third planetary gear set. The third planetary gear set has a third rotatable member to establish a medium speed ratio when it is braked. And the first electric motor/generator is connectable selectively with the first and second rotatable members, and the second electric motor/generator being connectable to selectively with one of the output shaft and the third rotatable member.

Preferably, the one of the planetary gear sets may be positioned to a first shaft, and the other to a second shaft parallel to the first shaft.

DESCRIPTION OF THE ACCOMPANYING DRAWINGS

DESCRIPTION OF THE EMBODIMENTS

A powertrain for hybrid electric vehicles embodying the invention will be described hereafter by referring to the accompanying drawings.

Figure 1:
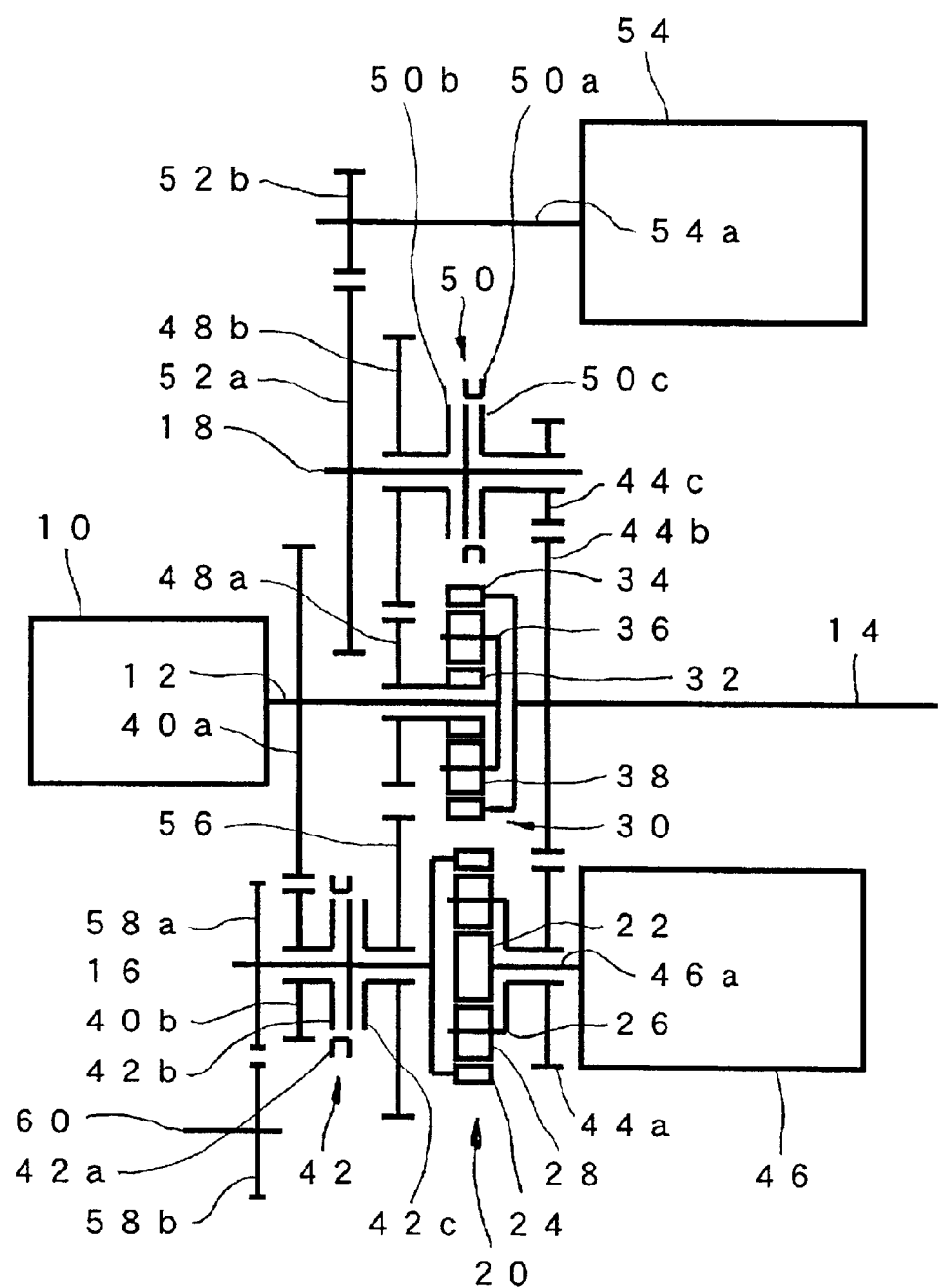
FIG. 1 shows a powertrain for hybrid electric vehicles according to the first embodiment of the present invention.

FIG. 1 shows a powertrain for hybrid electric vehicles according to the first embodiment of the invention.

The powertrain for the hybrid vehicles carries an internal combustion engine 10 (such as a gasoline engine or a diesel engine), a first electric motor/generator 46, a second electric motor/generator 54, a battery (not shown), and two sets of single-pinion type planetary gear sets (a first planetary gear set 20 and a second planetary gear set 30).

The both of the motors/generators 46 and 54 can be shifted selectively to function as a motor that drives wheels or an electric generator that converts mechanical energy from the engine 10 into electric energy for the motors and/or the battery when driven in a reverse rotation-direction.

The first planetary gear set 20 consists of three rotatable members: a first sun gear 22, a first ring gear (a first internal teethed gear) 24 coaxial with the first sun gear 22, and a first carrier 26 coaxial with the first sun gear 22.

The first carrier 26 functions as a first member of the present invention, the first ring gear 24 as a second member of the present invention, and the first sun gear 22 as a third members of the present invention.

The first carrier 26 supports rotatably the first pinions 28 to mesh with both of the first sun gear 22 and the first ring gear 24. The first sun gear 22 functions as a first rotatable member that establishes a low-speed ratio when it is braked.

The second planetary gear set 30 also consists of three rotatable members: a second sun gear 32, a second ring gear (a second internal teethed gear) 34 coaxial with the second sun gear 32, and a second carrier 36 coaxial with the second sun gear 32. The second carrier 36 supports rotatably second pinions 38 to mesh with both of the second sun gear 32 and the second ring gear 34.

The second carrier 36 functions as a fourth member of the present invention, the second ring gear 34 as a fifth member of the present invention, the second sun gear 32 as a sixth member of the present invention.

The second sun gear 32 functions as a second rotatable member that establishes a high-speed ratio by a mechanical drive when it is braked.

The second ring gear 34 functions as a driving member, and the second pinion an idle gear.

An input shaft 12, united with a crankshaft of the engine 10, is connected to the second carrier 36 and a first drive gear 40a. The drive gear 40a meshes with a first driven gear 40b supported rotatably on a first shaft 16 parallel to the input shaft 12 and an output shaft 14.

The first shaft 16 also supports rotatably a reverse gear 56 and is united with a fifth drive gear 58a. The drive gear 58a meshes with a fifth driven gear 58b united to an input shaft 60 of a power take-off device, such as a compressor of air-conditioner, an oil pump of a power-steering device, an accessory, and the like. The reverse gear 56 and the first driven gear 40b are respectively positioned at each side of a first shifting mechanism 42, such as a dog clutch.

The first sifting mechanism 42 has a first sleeve 42a, a clutch gear 42b united with the first driven gear 40b and a clutch gear 42c united with the reverse gear 56. The sleeve 42a can be moved along with the first shaft 16 to mesh with one of the clutch gears 42b, 42c or not to mesh with either of them (neutral position).

The first shaft 16 is also united with the first ring gear 24. The sun gear 22 is united with an output shaft 46a of the first motor/generator 46, and the first carrier 26 to a second drive gear 44a meshing with a second driven gear 44b. The second gear 44b is united to the output shaft 14.

On the other hand, the reverse gear 56 meshes with a third gear 48b supported rotatably on a second shaft 18. (The reverse gear 56 and the third gear 48b are drawn apart from each other in FIG. 1 for convenience.) The shaft 18, parallel to the input shaft 12 and the first shaft 16, supports rotatably a second drive gear 44c a third gear 48b, provided integrally with and a fourth driven gear 52a. The drive gear 44c and the driven gear 52a are respectively positioned at each side of a second shifting mechanism 50 such as a dog clutch.

The second shifting mechanism 50 has a second sleeve 50a, a clutch gear 50b united with the third gear 48b and a clutch gear 50c united with the second gear 44c. The sleeve 50a can be moved along with the second shaft 18 to mesh with one of the clutch gears 50b, 50c or not to mesh with either of them (neutral position).

The second drive gear 44c meshes with the second driven gear 44b connected to the output shaft 14.

The forth driven gear 52a meshes with a fourth driven gear 52b united to an output shaft 54a of the second electric motor/generator 54.

The output shaft 14 is connected with a final drive (not shown) equipped with a differential gear device (not shown).

Supplying electricity to the motor/generator 46, 54 and operating the engine 10 and the motor/generator 46, 54 are controlled by a controller (not shown).

The operations of the above powertrain are as follows.

First Drive Operation:

"A first drive operation" is defined as a drive mode that only the second motor/generator 54 drives the output shaft 14 to propel the vehicle.

On a departure and following acceleration, the first sleeve 42a is positioned at neutral position, while the second sleeve 50a meshes with the clutch gear 50c, thereby connecting the second gear 44c with the second shaft 18.

The battery supplies its electricity to the second motor/generator 54, but not to the first motor/generator 46. And fuel is cut to keep stopping the engine 10 because an engine's efficiency at partial load is low. Therefore only the second motor/generator 54 propels the vehicle via the fourth gears 52b, 52a, the second shaft 18, the second shifting mechanism 50, the second gears 44c, 44b, and the output shaft 14, which reduces fuel consumption.

In this operation, the fourth gears 52a, 52b increases the output torque of the second motor/generator 54 according to their reduced speed ratio, and then the second gears 44b, 44c further increase the multiplied torque from the gears 52a, 52b according to their reduced speed ratio to output a large torque.

Second Drive Operation:

"A second drive operation" is defined as the drive mode that the second motor/generator 54 drives the output shaft 14 with the first motor/generator 46 driven to generate electricity via the first planetary gear set 20.

(Starting the Engine)

At need to generate electricity by the first motor/generator 46 or to obtain a larger torque, the engine 10 is started as follows according to driving conditions:

While parking or running at low-speed by drive of the second motor/generator 54, the battery supplies its electricity to the first motor/generator 46 to output its torque through the first planetary gear set 20, the first shifting mechanism 42, and the first gears 40a, 40b, thereby driving the engine 10 to start.

On the other hand, while running at high-speed by drive of the second motor/generator 54, the second motor/generator 54 drives the first motor/generator 46 to generate electricity, thereby causing the engine 10 to start. This comes from the following reason: when a torque from the second motor/generator 54 applies the first motor/generator 46 in a reverse rotation-direction to generate electricity, it causes reaction to rotate the first ring gear 24. The gear 24 drives the engine 10 to start to rotate in a forward rotation-direction via the first shifting mechanism 42, and the first gears 40a, 40b. In both case, to start the engine 10, it is provided with fuel and ignition.

Propelling the Vehicle in the Second Drive Operation

In this operation, the vehicle is propelled as follows:

The engine 10 drives the output shaft 14 mechanically via the first planetary gear set 20, and also the first motor/generator 46 to generate electricity. The reason is as follows. The engine 10 drives the first ring gear 24 through the first gears 40a and 40b, the first shifting mechanism 42, causing the output shaft 14 to drive at a reduced speed ratio through the first carrier 26. The first carrier 26 applies its reaction torque to the first sun gear 12 to rotate in the reverse direction which makes the first motor/generator 46 rotate in the reverse direction to generate electricity. This generated electric power is transmitted to the second motor/generator 54 to drive the output shaft 14 with or without electric drive power from the battery like the first drive mode. Therefore the second motor/generator 54 is supplied to propel the vehicle in the second drive operation with electricity from the battery and the first motor/generator 46 driven by the engine 10, or from only the latter. In this operation, one part of the generated electric power may be transmitted to the battery.

Third Drive Operation:

"A third drive operation" is defined as the drive mode that the vehicle is propelled mechanically at a constant reduced speed ratio obtained by braking the first sun gear (the first rotatable member) 22.

In the second drive operation, the rotation-speed ratio (the rotation-speed of the input shaft 12 divided by that of the output shaft 14 is determined according to a torque from the engine 10, a load applied on the output shaft 14, and the amount of electricity transmitting between the second motor/generator 54 and the battery. The electric power generated by the first motor/generator 46 also changes according to them.

When the torque of the engine 10 and the load on the output shaft 14 are large, the rotation-speed of the input shaft 10 is very faster than that of the output shaft 14 at the beginning. As the vehicle's speed increases gradually, the load on the output shaft 14 becomes smaller. The rotation-speed of the output shaft 14 changes continuously to rise under a constant speed of the input shaft 12, and the speed of the first motor/generator 46 drops.

Increasing the vehicle's speed or decreasing the engine's speed causes the first sun gear 22 and the first motor/generator 46 to reduce their speeds and stop finally. To keep them braked, it is necessary for the battery to supply its electricity to the first motor/generator 46 to output torque in a forward rotation-direction. Its electricity's amount is small because a motor outputs the largest torque when motor's speed is zero.

So this brings the third drive operation that the engine's power is transmitted mechanically at a constant reduced speed ratio of i4×(1+α1)×i2 by braking the first sun gear (the first rotatable member) 22 where a teeth-number ratio of the first sun gear 22 to the first internal teethed gear 24 is α1, a teeth-number ratio of the first gears 40a, and 40b is i4, and the teeth-number ratio of the second gear 44a and 44b is i2.

As the first motor/generator 46 does not generate in this operation, the engine 10 is able to drive the vehicle mechanically without the drive of the second motor/generator 54, which is idling, or to drive it with the drive of the second motor/generator 54 supplied from the battery with its electricity. Also the engine 10 can drive the second motor/generator 54 mechanically at the reduced speed ratio to generate electricity to charge the battery.

Fourth Drive Operation:

"A fourth drive operation" is defined as the drive mode that the first motor/generator 46 drives the first sun gear 22 with the second motor/generator 54 driven by the second sun gear 32 to generate electricity.

In the third drive operation, the second planetary gear set 30 is kept a neutral state, which does not transmit power, when the battery does not supply its electricity to the second motor/generator 54.

The third gear 48b rotates at almost the a same speed as the second shaft 18 during the third drive operation when the gear ratios of the second gears 44b, 44c and the third gears 48a, 48b are set to adjust properly to the gear ratio α2 (the teeth-number ratio of the second sun gear 32 to the second ring gear 34).

To shift from the third drive operation to the fourth one, the battery stops its electric supply to the second motor/generator 54, and the second sleeve 50a of the second shifting mechanism 50 is moved to engage with the clutch gear 50b to connect the second shaft 18 with the third gear 48b. This shift is achieved smoothly, for the rotation-speed of the second shaft 18 is almost the same as the third gear 48b. This causes the second motor/generator 54, connected with the second sun gear 32, to rotate. Then second motor/generator 54 supplies its electricity to the first motor/generator 46, which causes the first motor/generator 46 to start to rotate in the forward direction. Its output torque drives the output shaft 14 via the first planetary gear set 20 and the second gears 44a, 44b.

In detail, the first sun gear 22, driven by the first motor/generator 46, drives the second carrier 36 at the reduced gear ratio, and its reaction torque applies to the input shaft 12 through the first ring gear 24, the first shifting mechanism 42 and the first gears 40a, 40b. This torque to the second carrier 36 united with the input shaft 12 is smaller than the output torque of the engine 10.

As seen above, the most part of the output from the engine 10 drives mechanically the output shaft 14 via the both planetary gear sets 20, 30, and the rest drives the second motor/generator 54 to generate electricity for supplying to the first motor/generator 46 to drive the output shaft 14.

Fifth Drive Operation:

"A fifth drive operation" is defined as a drive mode that the vehicle is propelled mechanically at a constant overdrive speed ratio obtained by braking the sun gear (the second rotatable member) 32.

The rotation-speed ratio in the fourth drive operation depends on the torque from the engine 10, the load applied on the output shaft 14, and the amount of electricity transmitting between the second motor/generator 54 and the battery. The electric power generated by the second motor/generator 54 also changes according to them.

When the torque of the engine 10 and the load on the output shaft 14 are large, the rotation-speed of the input shaft 12 is very faster than that of the output shaft 14 at the beginning. As the vehicle's speed increases gradually, the load on the output shaft 14 becomes smaller. The rotation-speed of the output shaft 14 changes continuously to rise under a constant speed of the input shaft 12, and the speed of the second motor/generator 54 drops.

Increasing the vehicle's speed or decreasing the engine's speed causes the second sun gear 32 and the second motor/generator 54 to reduce their speeds and stop finally. To keep them braked, it is necessary for the battery to supply its electricity to the second motor/generator 54 to output torque in a forward rotation-direction.

So this brings the fifth drive operation that the engine's power is transmitted mechanically at a constant overdrive speed ratio of $1/(1+\alpha 2)$.

In the fifth drive operation, the engine 10 drives the output shaft 14 mechanically at the overdrive ratio with the drive of the first motor/generator 46, supplied electricity from the battery, or drives the shaft 14 and the first motor/generator 46 to generate electricity for charging the battery.

Therefore the powertrain is able to sift continuously from the first drive operation to the fifth drive operation including the reduced gear ratio and the overdrive one, thereby starts the vehicle and run at high speed.

Slow Down the Vehicle and Braking

To reduce the vehicle speed slowly or to apply brake at a high-speed in the third drive operation to the fifth drive operation: the engine's fuel supply is cut, and the battery is charged by the first motor/generator 46 or the second motor/generator 54 in the reverse of function between a motor and a generator in the forward drive so as to obtain charge as much as can. This causes the vehicle's speed to drop.

At a low-speed, engaging the first sleeve 42a with the clutch gear 42b, and the second sleeve 50a with the clutch gear 50c shown in FIG. 1, the engine 10 is stopped and the second motor/generator 54 is driven to generate electricity, which reduces the vehicle's seed.

Controlling both motors/generators 46 and 54 and charging braking energies to the battery (regeneration) causes the vehicle to drop its speed at the desirable deceleration rate, which brings fuel economy to improve.

Reverse Drive Operation:

"A reverse drive operation" is defined as a drive mode that the second motor/generator 54 drives the output shaft 14 to propel the vehicle backward.

In order to drive backward, the first shifting mechanism 42 and the second shifting mechanism 50 are shifted as follows: the sleeve 42a is moved to mesh with the clutch the gear 42b, which brings the first gear 40b to be disengaged from the first gear 40b and also brings the first ring gear 24 to be connected to the reverse gear 56. The sleeve 50a is moved to mesh the clutch gear 50c, which brings the second shaft 18 to be connected to the second drive gear 44c.

When the engine 10 is stopped, the battery supplies its electricity to the second motor/generator 54 to output a torque in a reverse rotation-direction, thereby starting and accelerating the vehicle backward.

When the engine 10 runs to drive the first motor/generator 46 to generate, the second sun gear 32 and the first ring gear 24 are connected through the third gears 48a, 48b, and reverse gear 56, which brings the first ring gear 24 to be rotated in the rotation direction opposite to the rotation-direction in the second drive operation.

Specifically, the torque from the engine 10 is transmitted to the second planetary gear set 30 through the input shaft 12 to the second carrier 36, and then divided here: one part of the torque drives the output shaft 14 via the ring gear 34, and the rest drives the second sun gear 32 in the forward rotation-direction. This gear 32 rotates the first ring gear 24 in the reverse rotation-direction. In this case, the third gear 48b works as an idle gear, thereby the first ring gear 24 drives the first carrier 26 at a reduced speed ratio in the reverse rotation-direction, and its reaction drives the first sun gear 22 to rotate in the forward direction. The first sun gear 22 drives the first motor/generator 46 to generate and supply its generated electric power to the second motor/generator 54 via the controller. Although, in the backward drive, the torque from the second ring gear 34 drives the output shaft 14 in the forward-direction, the larger torque from the first carrier 26 and the second motor/generator 54 drives it in the reverse-direction, which causes a reverse-direction torque as large as the second drive operation.

Power Take-Off Operation:

"A power take-off operation" is defined as a drive mode that take-off devices, such as oil pumps of power steering device and compressors of air conditioners, is driven by the engine 10 or the first motor/generator 46.

When the engine 10 runs, the sleeve 42a of the first shifting mechanism 42 is moved to engage with the clutch gear 42b. So the engine 10 drives the shaft 60 of the power take-off device via the first gears 40a, 40b, the first shifting mechanism 42 and the fifth gears 58a and 58b.

When the engine 10 is stopped for parking and the like, the first shifting mechanism 42 is kept at neutral, and the battery supplies electricity to the first motor/generator 46 to drive in the reverse direction. This causes the first ring gear 24 to rotate in the forward direction and drive the shaft 60. As the backward-direction torque applies to the first carrier 26 in this case, it is necessary for a parking brake device to brake the wheels, or for the second motor/generator 54 to apply the forward torque to the wheel to cancel the backward-direction torque. Therefore the powertrain can drive the power take-off device for cars, dump trucks, fire engines, dustcarts, and so on both at parking and at vehicle running.

As has been noted above, the powertrain of the first embodiment can drive in the 5 forward drive operations including the reduced gear ratio and the overdrive gear ratio, the backward drive operation, and the power take-off drive operation. These 5 forward drive operations are shifted continuously from one to another, and enable to obtain large torque sufficient for hill-climbing or rapid acceleration and also to improve fuel economy at low or medium speed. Besides the second motor/generator 54 may be a small one, for its output is multiplied by the gear ratios of the fourth gears 52a and 52b and the second gears 44b and 44c.

Figure 2:
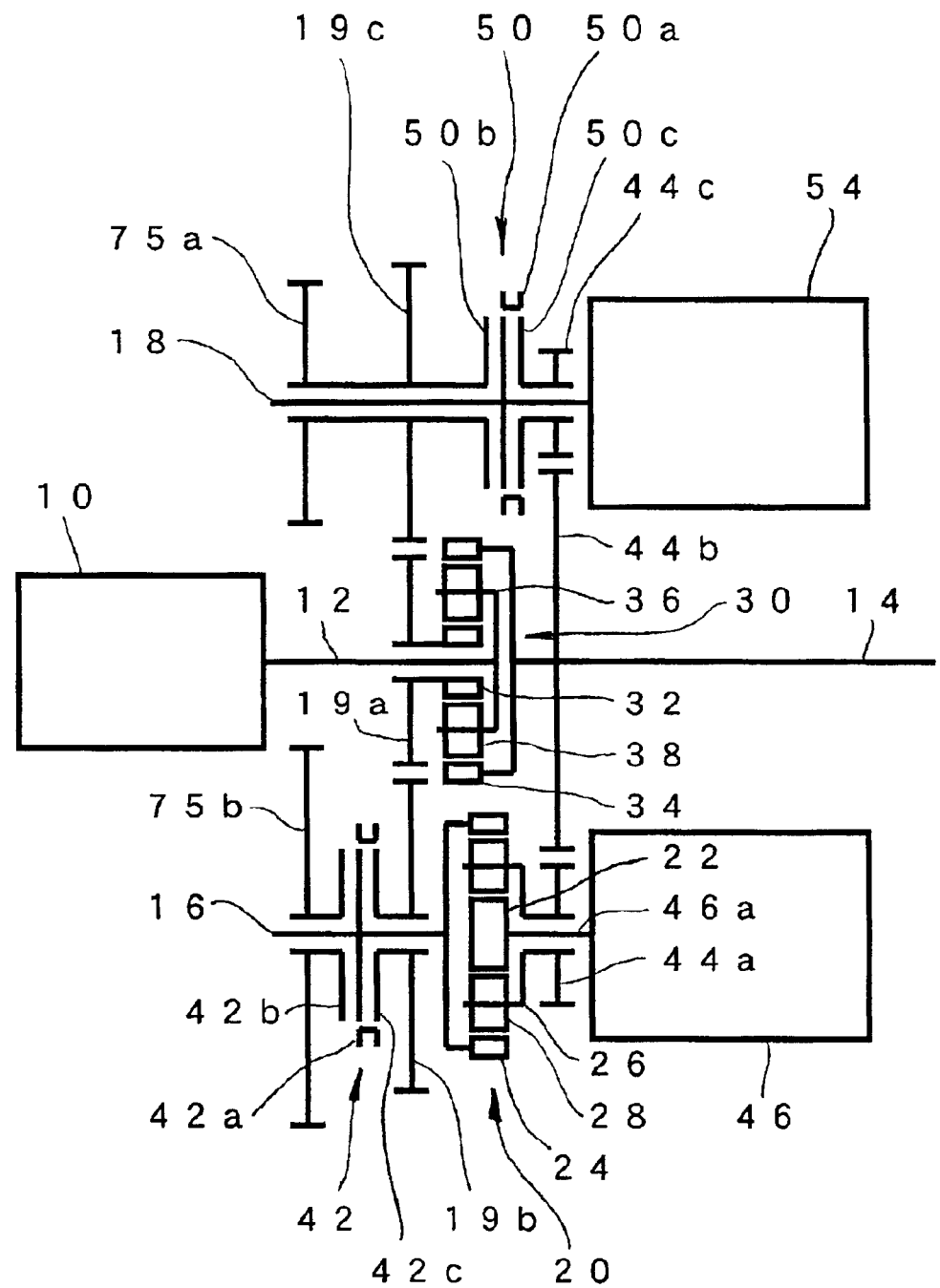
FIG. 2 shows a powertrain for hybrid electric vehicles according to the second embodiment of the invention.

FIG. 2 shows a powertrain for hybrid vehicles according to the second embodiment of the invention, whose parts of similar to the embodiment of FIG. 1 are denoted by the same reference numerals, and their explanation are abbreviated here.

This powertrain has, as the same as that of FIG. 1, the engine 10, the input shaft 12, the output shaft 14, the first electric motor/generator 46, the second electric motor/generator 54, the battery (not shown), and two sets of single-pinion typed planetary gear sets (the first planetary gear set 20 and the second planetary gear set 30).

The first sun gear 22 of the first planetary gear set 20 functions as a first rotatable member that establishes a low speed ratio when it is braked.

The second sun gear 32 functions as a second rotatable member that establishes an overdrive speed ratio by a mechanical drive when it is braked.

The first shaft 16 supports a reverse gear 75b to mesh with a reverse gear 75a rotatable on the second shaft 18. (The reverse gears 75a, 75b are drawn apart each other in FIG. 2 for convenience.) The first shaft 16 also supports rotatably the clutch gears 42b and 42c, and a first driven gear 19b. The clutch gear 42b is united with the reverse gear 75b, the clutch gear 42c with the first driven gear 19b. The first shaft 186 is selectively joined to one of the clutch gears 42b and 42c by the movable sleeve 42a, or not to either. The sleeve 42a and the clutch gears 42a and 42b comprise the first shifting means 42.

The second shaft 18, also as an output shaft of the second motor/generator 54, supports rotatably the reverse gear 75a, a first driven gear 19c, and a clutch gear 50b. The reverse gear 75a, the clutch gear 50b, and the first driven gear 19c are united all together. The first driven gear 19c meshes a first drive gear 19a connected to the second sun gear 32. The second shaft 18 also supports rotatably a clutch gear 50c and a second drive gear 44c united with the gear 50c. The second shaft 18 is selectively joined to one of the clutch gear gears 50b and 50c movable sleeve 50a, or not to either. The sleeve 50a and the clutch gears 50b and 50c function as the second shifting means 50.

This powertrain of the second embodiment drives in the 5 forward drive operations and the backward operation as the same as that of the first embodiment.

Figure 3:
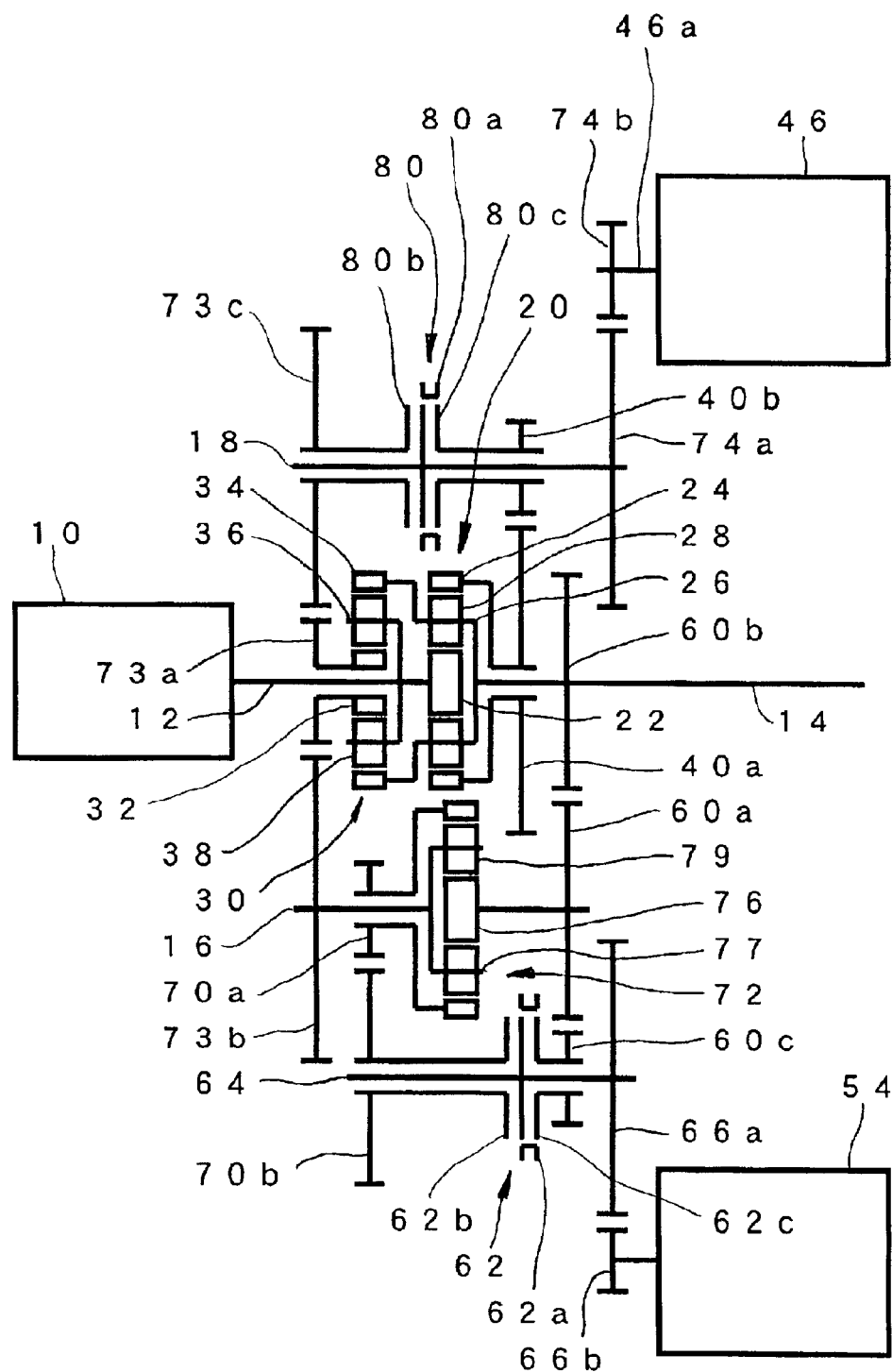
FIG. 3 shows a powertrain for hybrid electric vehicles according to the third embodiment of the invention.

FIG. 3 shows a powertrain for hybrid vehicles according to the third embodiment of the invention, whose parts of similar to the embodiment of FIG. 1 are denoted by the same reference numerals.

In this embodiment, the planetary gear sets comprises three sets.

The powertrain carries the internal combustion engine 10, the first electric motor/generator 46, the second electric motor/generator 54, the battery (not shown), and three sets of single-pinion type planetary gear sets (the first planetary gear set 20, the second planetary gear set 30, and a third planetary gear set 72).

The both of the motors/generators 68 and 71 can be shifted selectively to function as a motor that drives wheels (not shown) or an electric generator that converts mechanical energy from the engine 10 into electric energy for the motors and/or the battery when driven in a reverse rotation-direction.

The first and the second planetary gear sets 20, 30 are supported on an input shaft 12 coaxial with the output shaft 14. The third planetary gear set 72 is supported on the first shaft 16 parallel to the input shaft 12 and the output shaft 14.

The first planetary gear set 20 consists of three rotatable members: the first sun gear 22, the first ring gear (the first internal teethed gear) 24 coaxial with the first sun gear 22, and the first carrier 26 coaxial with the first sun gear 22. The sun gear 22 is united with the input shaft 12 connected to the crankshaft of the engine 10. The first carrier 26 supports rotatably first pinions 28 to mesh with both of the sun gear 22 and the ring gear 24, and is connected to the output shaft 14. The ring gear 24 is united with the first driven gear 40a to engage with the first drive gear 540b. The first ring gear 24 functions as a first rotatable member that establishes a low-speed ratio when it is braked.

The second planetary gear set 30 also consists of three rotatable members: the second sun gear 32, the second ring gear (the second internal teethed gear) 34 coaxial with the second sun gear 32, and the second carrier 36 coaxial with the second sun gear 32. The second carrier 36 supports rotatably second pinions 38 to mesh with both of the second sun gear 32 and the second ring gear 34. The sun gear 32 is united with a third drive gear 73a, the carrier 36 with the input shaft 12, and the ring gear 34 with the first carrier 26. The second sun gear 32 functions as a second rotatable member that establishes a high-speed ratio by a mechanical drive when it is braked.

The third planetary gear set 72 also consists of three rotatable members: a third sun gear 76, a third ring gear (a second internal teethed gear) 78 coaxial with the third sun gear 76, and a third carrier 77 coaxial with the third sun gear 76. The sun gear 76 is united with a fourth idle gear 60a to mesh with a forth driven gear 60b. The fourth driven gear 60b, connected to the output shaft 14, meshes with the fourth idle gear 60a meshed with a fourth drive gear 60c. The third carrier 77 supports rotatably third pinions 79 to mesh with both of the sun gear 76 and the ring gear 78, and is united with the first shaft 16. The ring gear 78 is united with a sixth driven gear 70a to mesh with a sixth drive gear 70b.

The third drive gear 73a meshes with a third driven gear 73c united with a clutch gear 80b. The clutch gear 80b is supported rotatably on a second shaft 18 to support a clutch gear 80c united with a second driven gear 74a. The second driven gear 74a, connected to the second shaft 18, meshes with a second drive gear 74b united with an output shaft 46a of the first motor/generator 46. The second shaft 18 is selectively joined to one of the clutch gear 80b, 80c by a movable sleeve 80a, or not to either. The sleeve 80a and the clutch gears 80b and 80c functions as a first shifting means 80.

The sixth driven gear 70a meshes with a sixth drive gear 70b, united with a clutch gear 62b, on a third shaft 64. The third shaft 64 also supports rotatably a clutch gear 62c and the fourth drive gear 60c united each other. The third shaft 64 is selectively joined to one of the clutch gears 62b and 62c by a movable sleeve 62a, or not to either. The sleeve 62a and the clutch gears 62b and 62c function as a second shifting means 62.

The third shaft 64 is parallel to the input shaft 12, the output shaft 14, the first shaft 16 and the second shaft 18, and united with a fifth drive gear 66a to mesh a fifth driven gear 66b. The gear 66b is united with an output shaft 54a of the second motor/generator 54.

Supplying electricity to the motors/generators 46 and 54 and operating the engine 10 and the motors/generators 46 and 54 are controlled by a controller (not shown)

The Operations are as Follows:

First Drive Operation:

"A first drive operation" is defined a drive mode that only the second motor/generator 54 drives the output shaft 14 to propel the vehicle.

On this departure and following acceleration, the first sleeve 80a is positioned at neutral position, while the second sleeve 62a meshes with the clutch gear 62c, thereby connecting the fourth gear 60c with the third shaft 64.

The battery supplies electricity to the second motor/generator 54, but not to the first motor/generator 46. And fuel supply is cut to keep stopping the engine 10. Therefore only the second motor/generator 54 drives the output shaft 14 to propel the vehicle through the fifth gears 66a, 66b, the third shaft 64, the second shifting mechanism 62, and the fourth gears 60a, 60b and 60c.

Second Drive Operation:

"A second drive operation" is defined as the drive mode that the second motor/generator 54 drives the output shaft 14 to propels the vehicle with the first motor/generator 46 driven to generate via the first planetary gear set 20.

Starting the Engine 10

At need to generate by the first motor/generator 46 or to obtain a larger torque, the engine 10 is started as follows according to driving conditions:

While parking or running at a low speed by the drive of the second motor/generator 54, the battery supplies its electricity to the first motor/generator 46. It drives the engine 10 to start via the second gears 74a and 74b, the first shifting mechanism 80, the third gears 73a and 73c, the first planetary gear set 20 and the input shaft 12.

On the other hand, while running at high speed by the drive of the second motor/generator 54, the second motor/generator 54 drives the first motor/generator 46 to generate electricity, thereby causing the engine 10 to start. In both case, to start the engine 10, it is provided with fuel and ignition.

Driving by the Second Motor/Generator 54 with the Engine 10 Running

The engine 10 drives the first sun gear 22 to reduce a rotation-speed of the first carrier 26 and the output shaft 14 united therewith. The carrier 26 causes reaction to drive the first ring gear 24 in the reverse direction, which brings the first motor/generator 46 to generate electricity. The electricity is provided to the second motor/generator 54 to drive through the controller.

In the second drive operation the vehicle is, therefore, propelled by a torque transmitted mechanically from the engine 10 via the first planetary gear set 20, and a torque transmitted from the second motor/generator 54.

Third Drive Operation:

"A third drive operation" is defined as the drive mode that the vehicle is propelled mechanically at a constant reduced speed ratio obtained by braking the first ring gear (the first rotatable member) 24.

The speed ratio in the second operation depends on the torque from the engine 10, the load on the output shaft 14, and the electric power provided from the battery to the second motor/generator 54. The electric power generated by the first motor/generator 46 also varies according to them.

Like the case of the first embodiment, when the torque of the engine 10 and the load on the output shaft 14 are large, the rotation-speed of the input shaft 10 is very faster than that of the output shaft 14 at the beginning. So the vehicle's speed increases gradually, the load on the output shaft 14 becomes smaller. The rotation-speed of the output shaft 14 changes continuously to rise under a constant speed of the input shaft 12, and the speed of the first motor/generator 46 reduces.

Increasing the vehicle's speed or decreasing the engine's speed causes the first ring gear 24 and the first motor/generator 46 to reduce their speeds and stop finally. To keep them braked, it is necessary for the battery to supply its electricity to the first motor/generator 46 to output torque in a forward rotation-direction.

Braking the first ring gear (the first rotatable member) 24 brings the third operation that the second motor/generator 54 drives at reduce speed ratio of $(1+\alpha 1)/\alpha 1$. As the first motor/generator 46 does not generate electricity in this operation, the engine 10 is able to drive the vehicle mechanically without the drive of the second motor/generator 54, which is idling, or to drive it with the drive of the second motor/generator 54 supplied from the battery with its electricity. Also the second motor/generator 64 can be driven to generate electricity to charge the battery.

Fourth Drive Operation:

"A fourth drive operation" is defined as the drive mode that the first motor/generator 46 drives the output shaft 14 via the first planetary gear set 20 with the second motor/generator 54 driven via the second planetary gear set 30 and the third planetary gear set 72.

When the second motor/generator 54 is idling, no torque applies the second shifting mechanism 62. So adjusting the gear ratios properly, the fifth gear 66a rotates at almost the same speed as the sixth gear 70b, which enables the second sleeve 62a to engage with the clutch gear 62b smoothly. This causes the third ring gear 78 to connect with the second motor/generator 54. It supplies its generated electricity to the first motor/generator 46 to drive, which causes the gear ratio to change smaller than that in the third drive operation.

In the fourth drive operation the first motor/generator 46 drives the output shaft 14 through the first planetary gear set 20, which causes reaction to the first sun gear 22 to rotate, thereby torque inputted to the second planetary gear set 30 from the engine 10 becomes smaller. This means that the engine 10 drives the first motor/generation 46 to generate electricity via the second planetary gear set 30 and the third planetary gear set 72 but its generated amount becomes smaller. In the fourth drive operation the engine 10 drives the output shaft 14 mechanically, which improves the fuel economy than in the second drive operation.

Fifth Drive Operation:

"A fifth drive operation" is defined as the drive mode that the vehicle is propelled at a medium speed ratio obtained by stopping the third ring gear (the third rotatable member) 78.

The speed ratio in the fourth drive operation depends on the torque of the engine 10, the load on the output shaft 14, and the electricity transmitting between the battery and the second motor/generator 54. The electricity generated by the second motor/generator 54 also depends on them.

When the torque of the engine 10 and the load on the output shaft 14 are large, the rotation-speed of the input shaft 10 is very faster than that of the output shaft 14 at the beginning. As the vehicle's speed increases gradually, the load on the output shaft 14 becomes smaller. The rotation-speed of the output shaft 14 changes continuously to rise under a constant speed of the input shaft 12, and the speed of the second motor/generator 46 drops.

Increasing the vehicle's speed or decreasing the engine's speed causes the third ring gear 78 and the second motor/generator 54 to reduce their speeds and stop finally. To keep them braked, it is necessary for the battery to supply its electricity to the second-motor/generator 54 to output torque in a forward rotation-direction.

Braking the third ring gear (the third rotatable member) 78 brings the fifth operation that the engine 10 drives at a medium speed ratio of $\{(1+\alpha 3)+\alpha 2 \times \alpha 2 \times i3 \times i4\}/\{(1+\alpha 2) \times (1+\alpha 3)\}$, where the teeth-number ratio of the third gears is i3, and that of the fourth gears 60a, 60b is i4.

As the second motor/generator 54 does not generate electricity in the fifth drive operation, the engine 10 is able to drive the vehicle mechanically without the drive of the first motor/generator 46, which is idling, or to drive it with the drive of the drive of the first motor/generator 46 supplied from the battery with its electricity. Also the first motor/generator 46 can be driven to generate electricity to charge the battery.

Sixth Drive Operation:

"A sixth drive operation" is defined as the drive mode that the second motor 54 drives the output shaft 14 via the third planetary gear set 72 with the first motor/generator 46 driven via the second planetary gear set 30 to generate electricity.

When the first motor/generator 46 is idling, no torque applies the first shifting mechanism 80. So adjusting the gear ratios properly, the first gear 40b rotates at almost the same speed as the third gear 73c, which enables the first sleeve 80a to engage with the clutch gear 80b smoothly. This causes the second sun gear 32 to connect with the first motor/generator 46. It supplies its generated electricity to the second motor/generator 54 to drive, which causes the reduced gear ratio to change smaller than that in the fifth drive operation.

In the sixth drive operation the second motor/generator 54 drives the output shaft 14 via the third planetary gear set 72 with the first motor/generator 54 driven via the second planetary gear set 30 to generate. The most part of the engine's output drives the output shaft 14 by a mechanical transmission, which brings to improve fuel economy better than the second drive operation.

Seventh Drive Operation:

"A seventh drive operation" is defined as the drive mode that the second planetary gear set 30 gives a mechanical overdrive gear ratio by stopping the second sun gear 32.

The speed ratio in the seventh drive operation depends on the torque of the engine 10, the load on the output shaft 14, and the electricity transmitting between the battery and the second motor/generator 54. The electricity generated by the first motor/generator 46 also depends on them.

When the torque of the engine 10 and the load on the output shaft 14 are large, the rotation-speed of the input shaft 12 is very faster than that of the output shaft 14 at the beginning. As the vehicle's speed increases gradually, the load on the output shaft 14 becomes smaller. The rotation-speed of the output shaft 14 changes continuously to rise under a constant speed of the input shaft 12, and the speed of the first motor/generator 46 drops.

Increasing the vehicle's speed or decreasing the engine's speed causes the second sun gear 32 and the first motor/generator 46 to reduce their speeds and stop finally. To keep them braked, it is necessary for the battery to supply its electricity to the first motor/generator 46 to output torque in a reverse rotation-direction.

Braking the second sun gear 32 brings the seventh operation that the engine 10 drives at an overdrive speed ratio of $1/(1+\alpha 2)$ mechanically via the second planetary gear set 30 by braking the second sun gear 32. In this operation, the engine 10 drives the output shaft 14 with the drive of the second motor/generator 54, supplied with electricity from the battery, or drives the shaft 14 and the second motor/generator 54 to generate electricity for charging the battery.

Reverse Drive Operation:

"A reverse drive operation" is defined as the drive mode that the second motor/generator 54 drives the output shaft 14 in the reverse rotation-direction to propel the vehicle backward.

In order to drive backward, the first shifting mechanism 80 and the second shifting mechanism 62 are shifted as follows: the first sleeve 80a is moved to mesh with the clutch gear 80b, which brings the second sun gear 32 to connect with the first motor/generator 46. The second sleeve 62a engages with the clutch gear 62c.

Reverse drive when the engine 10 is stopped: the battery supplies its electricity to the second motor/generator 54 to output a torque in a reverse rotation-direction, thereby starting and accelerating the vehicle backward.

Reverse drive when the engine 10 runs to drive the input shaft 12, the torque inputted to the second carrier 36 via the input shaft 12 is divided by the second planetary gear set 30: one part of the torque drives the output shaft 14 via the second ring gear 34 in the forward direction, and the rest drives the first motor/generator 46 to generate electricity. This generated electricity is supplied to the second motor/generator 54 to propel the output shaft 14 in the reverse direction. The torque of the output shaft 14 in this case is smaller than the case of supplying electricity from the battery.

As has been noted above, the powertrain of the third embodiment can drive in the 7 forward drive operations including the reduced gear ratio, the medium gear ratio, the overdrive gear ratio, and the backward drive operation. These 7 forward drive operations are shifted continuously from one to another, and enable to obtain large torque sufficient for trucks and the like. And they also improve fuel economy at low or medium speed. Besides Regeneration by the both motors/generators 46 and 54 during braking also improve fuel economy.

Figure 4:
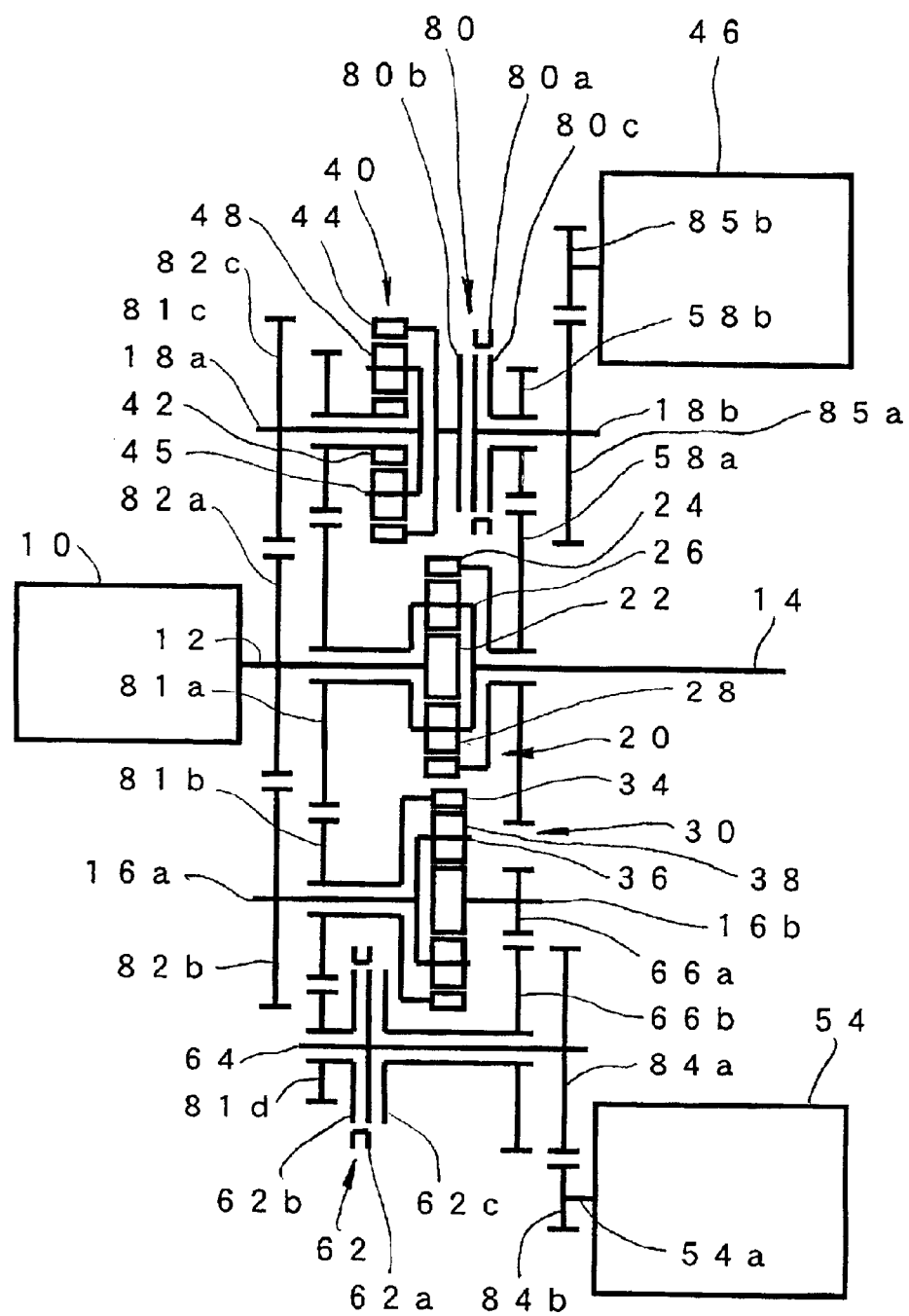
FIG. 4 shows a powertrain for hybrid electric vehicles according to the forth embodiment of the invention.

FIG. 4 shows a powertrain for hybrid vehicles according to the fourth embodiment of the invention, whose parts of similar to the embodiments of FIGS. 1 and 3 are denoted by the same reference numerals, and their explanation are abbreviated here.

The powertrain of this embodiment also has three planetary gear sets; the first planetary gear set 20 on the input shaft 12, the second planetary gear set 30 on first shafts 16a and 16b, the third planetary gear set 72 on the second shaft 18.

The first sun gear 22 is connected to the input shaft 12 and a first drive gear 82a. The first carrier 26 is united with a second drive gear 81a and the output shaft 14. The ring gear 24 is united with a third drive gear 58a, both of which are supported rotatably on the output shaft 14.

The second sun gear 32 is united with a fifth drive gear 66a to mesh with a fifth driven gear 66b. The second carrier 36 is connected to the first shaft 16a. The ring gear 34 is united with the second idle gear 81b, both of which are supported rotatably on the first shaft 16a parallel to the input shaft 12. The second idle gear 81b meshes with a second driven gear 81d.

The third sun gear 42 is united with a second driven gear 81c to mesh with a second drive gear 81a. The second drive gear 81a also meshes with the second idle gear 81b. The third carrier 45 is connected to the second shaft 18a parallel to the input shaft 12 and the first shaft 16. The third ring gear 44 is united with the clutch gear 80b.

Coaxial with the second shaft 18a, a second shaft 18b is arranged to support rotatably the clutch gear 80c and a third driven gear 83b united with the gear 80c. The third driven gear 58b meshes with the third drive gear 58a. The second shaft 18b is selectively joined to one of the clutch gears 80b and 80c by the movable sleeve 80a, or not to either. The sleeve 80a and the clutch gears 80b and 80c function as a first shifting means 80. The second shaft 18b is connected to a fourth driven gear 85a to mesh a fourth drive gear 85b united with an output shaft 46a of the first motor/generator 46.

Parallel to the input shaft 12, the first shaft 16a and the second shafts 18a and 18b, a third shaft 64 is arranged to support rotatably clutch gears 62b and 62c, a second driven gear 81d and a fifth driven gear 66b. The third shaft 64 is selectively joined to one of the clutch gears 62b and 62c by the movable sleeve 62a, or not to either. The sleeve 62a and the clutch gears 62b and 62c function as the second shifting means 62.

The fifth driven gear 66b meshes with a fifth drive gear 66a connected to the first shaft 16b coaxial to the first shaft 16a. The third shaft 64 is connected to a sixth drive gear 84a to mesh with a sixth driven gear 84b secured to an output shaft 54a of the second motor/generator 54.

The first drive gear 82a, connected to the input shaft 12, meshes with a first driven gear 82b connected to the first shaft 16a and with a first driven gear 82c connected to the second shaft 18a.

This powertrain of the fourth embodiment drives in the 7 forward drive operations and the backward operation as the same as that of the third embodiment.

The present disclosure relates to subject matters in Japanese Patent Applications No. Hei 11-175885 filed on May 19, 1999 (Publication No. 2000-326739 published on Nov. 28, 2000) and No. Hei 11-220333 filed on Jun. 29, 1999 (Publication No. 2001-010361 published on Jan. 1, 2001), which is expressly incorporated herein by reference in its entirety.

What is claimed is:

1. A powertrain for hybrid vehicles comprising:
   an internal combustion engine;
   an input shaft driven by said engine;
   an output shaft;
   a plural sets of planetary gear sets between said input shaft and said output shaft, said planetary gear sets including a first planetary gear set and a second planetary gear set, said first planetary gear set having a first rotatable member, and said second planetary gear set having a second rotatable member, said first rotatable member establishing a reduced speed ratio when said first rotatable member is braked, said second rotatable member establishing an overdrive speed ratio when said second rotatable member is braked;
   a first electric motor/generator connectable with said first rotatable member;
   a second electric motor/generator being connected with said output shaft and free from said second rotatable member at a low-speed ratio, said second electric motor/generator being connected to said second rotatable member at a high-speed ratio.

2. The powertrain according to claim 1, wherein said plural sets of planetary gear sets comprises said first planetary gear set and said second planetary gear set, and said second planetary gear set having a driving member to drive said second rotatable member via an idle gear.

3. The powertrain according to claim 2, wherein said driving member drives a shaft of a power take-off device.

4. The powertrain according to claim 1, wherein said plural sets of planetary gear sets comprises said first planetary gear set, said second planetary gear set, and a third planetary gear set, said third planetary gear set having a third rotatable member that establishes a medium speed ratio when said third rotatable member is braked, said first electric motor/generator being selectively connectable with one of said first rotatable member and said second rotatable member, and said second electric motor/generator being connectable selectively with one of said output shaft and said third rotatable member.

5. The powertrain according to claim 1 wherein further comprises a first shaft and a second shaft in a parallel with each other, one of said planetary gear sets being positioned on said first shaft, and another of said planetary gear sets being said second shaft.

* * * * *